2,797,197
SOLUBLE OIL AND PREPARATION

Norman Thompson, Media, and Willard K. Parcells, Chester, Pa., assignors to Sun Oil Company, Philadelphia, Pa., a corporation of New Jersey No Drawing. Application July 2, 1956,
Serial No. 595,132

5 Claims. (Cl. 252—33.3)

This invention relates to soluble oils containing alkali metal petroleum sulfonates and products of oxidation of mineral oil, and to the preparation of such soluble oils.

Soluble oils as contemplated here are mixtures of mineral lubricating oil, alkali metal petroleum mahogany sulfonates, and alkali metal soaps of carboxylic acids, which mixtures are emulsifiable in water to obtain oil-in-water emulsions useful for various purposes, e. g. as lubricant and coolant in metal-working operations. The carboxylate soaps in such composition act as auxiliary emulsifying agent and as rust inhibitor.

A satisfactory soluble oil must meet certain rather rigid specifications including requirements as to oil stability prior to emulsification and emulsion stability after emulsification in water. Prior to emulsification, it should not undergo any substantial gelation or clouding, or separation of individual components; after emulsification, the emulsion should not undergo any substantial separation of oil, or formation of "cream" or "scum" on the surface of the emulsion. These requirements have previously been difficult to meet, particularly in instances where the soluble oil contains carboxylic acids produced by partial oxidation of mineral oil. The present invention provides a soluble oil which contains such carboxylic acids, and which is highly satisfactory in oil stability, emulsion stability, and other important properties.

In U. S. Patent 2,395,627, issued February 27, 1946, to Herbert L. Johnson and John Harold Perrine, there is disclosed a soluble oil containing only the relatively weak carboxylic acid products of oxidation of mineral oil. Preparation of such soluble oil involves previous separation of the relatively weak carboxylic acid products from the stronger carboxylic acid products and also from un-oxidized oil and from unsaponifiable oxidation products. The soluble oil of the present invention, on the other hand, contains not only the relatively weak carboxylic acid products of oxidation, but the other oxidation products and the unoxidized mineral oil as well, and no previous separation according to type of the liquid oxidation products, i. e. those which are liquid at the oxidation temperature, is involved in the preparation of the soluble oil.

According to the present invention, a soluble oil composition is provided comprising mineral lubricating oil, alkali metal petroleum mahogany sulfonates, and the saponified, unseparated liquid products obtained by oxidation of petroleum foots oil under conditions as subsequently specified, those products providing all or part of the carboxylate content of the soluble oil.

The liquid oxidation product may provide 100 percent of the carboxylate saponification number equivalent of the soluble oil composition according to the invention, or it may provide only a part, e. g. 20 to somewhat less than 100 percent, of such equivalent, the remainder being provided by petroleum naphthenic acids. Where only part of the equivalent is provided by the liquid oxidation product, that part is preferably 20 to 75 percent, more preferably 40 to 60 percent.

The organic $SO_3$ content of the soluble oil according to the invention, which content is provided by the sulfonates therein, must be at least 0.3 weight percent in order to obtain satisfactory stability. Higher organic $SO_3$ contents must be present in some instances to obtain satisfactory stability: generally the required organic $SO_3$ content increases with increasing concentration of liquid oxidation product in the soluble oil composition. Thus, when the liquid oxidation product provides substantially all the carboxylate saponification number equivalent, no naphthenates being present, the organic $SO_3$ content should be at least 0.5 weight percent, more preferably 0.65 weight percent. Generally, the organic $SO_3$ content of soluble oils according to the invention will not exceed 1.0 weight percent, though higher concentrations may be employed.

The carboxylate saponification number equivalent of the soluble oil according to the invention should not be greater than 20 mg. of KOH per gram; otherwise, the oil stability is not satisfactory. Preferably the carboxylate saponification number equivalent is not greater than 17. The lower limit of carboxylate saponification number equivalent depends on the organic $SO_3$ content; generally, the carboxylate saponification number equivalent will not be less than 10.

The mineral lubricating oil employed in the soluble oil composition according to the invention preferably has S. U. viscosity at 100° F. within the range from 40 to 120. The petroleum foots oil which is used as oxidation charge, on the other hand, preferably has S. U. viscosity at 100° F. within the range from 125 to 200.

Petroleum foots oil is the oily byproduct obtained in the deoiling of slack wax. When the deoiling is done by sweating the foots oil is sometimes called sweat oil or sweater oil. When the deoiling is done by filtration of a solution of the slack wax in a solvent for oil, the filtrate obtained is a solution of foots oil in the solvent used, e. g. methyl ethyl ketone or mixtures thereof with toluene and/or benzene, and foots oil can be recovered from the filtrate by stripping off the solvent. Petroleum foots oils generally contain substantial amounts of low-melting wax in addition to lubricating oil, the amount of wax depending on the filtration temperature and other variables.

The foots oil which is oxidized according to the present invention is one which has insufficient content of aromatic compounds to substantially inhibit the oxidation; in order to obtain satisfactory oxidation, the weight percent of compounds containing an aromatic ring is preferably less than 20 percent (as determined by selective adsorption on silica gel), more preferably less than 15 percent. Foots oil containing sufficiently low aromatic content can be obtained, for example, in the manner subsequently described in an example from a solvent-refined lubricating oil, or in any other suitable manner.

The foots oil employed according to the invention is preferably one which is obtained from a distillate fraction of a low aromatic content petroleum fraction, e. g. a solvent-refined petroleum fraction. Such foots oil provides upon oxidation a product which is particularly suitable for preparation of soluble oil. Preferably the S. U. viscosity at 210° F. of the foots oil employed according to the invention is within the approximate range 30–80, as compared with a viscosity of about 90 for a typical foots oil obtained from a residual, rather than a distillate, fraction of a low aromatic content petroleum fraction.

A particularly suitable manner in which a foots oil for use according to the present invention can be prepared is by dewaxing a solvent-refined lubricating oil by dissolving the oil in a solvent such as a mixture of methyl ethyl ketone, benzene, and toluene, cooling to a relatively low temperature, e. g. about −10° F., and filtering to obtain slack wax, vacuum distilling the slack wax to obtain a distillate boiling within the approximate range 325° F. to 650° F. at 10 mm. Hg, and deoiling the distillate by dissolving in a solvent such as the above mixture at a relatively high temperature, cooling to a temperature, for example, of about 30° F., and filtering to obtain deoiled wax as filter cake, and, as filtrate, a solution of foots oil, from which solution the foots oil can be recovered by stripping solvent therefrom.

The oxidation of the foots oil is performed by contacting the heated foots oil in liquid state with a free-oxygen-containing gas, e. g. air, oxygen, ozonized air, etc. The oxidation is conducted under atmospheric pressure or relatively low elevated pressure, preferably not exceeding 10 p. s. i. g. Such operation is advantageous in that the vent gases carry off some of the lower-boiling acidic products, which impart unsatisfactory properties to soluble oils, and which in operation at higher pressures would remain in the liquid oxidation product. The oxidation is preferably conducted in the presence of an oxidation catalyst, such as manganese naphthenate, manganese soaps of fatty acids, manganese soaps of carboxylic acids obtained in previous oxidations of mineral oil, other manganese, barium, or magnesium soaps, etc.; mixed catalysts can be used.

The oxidation temperature is preferably not greater than 290° F., since higher temperatures tend to produce oxidation products having unsatisfactory quality for use in soluble oils. Generally, the oxidation temperature will be at least 220° F., though lower temperatures may be used in some instances.

Any suitable rate of introduction of oxygen-containing gas into the foots oil can be employed. Generally, high oxygen rates increase the speed of the oxidation. Intimate contact between oxygen and foots oil, as obtained for example by blowing air upwardly through the foots oil, also increases the oxidation rate.

The oxidation is continued at least until the saponification number of the liquid oxidation product is 60 mg. of KOH per gram, and is terminated before the saponification number of the liquid oxidation product exceeds 100. Oxidation to too high a saponification number tends to result in formation of oxidation products which have adverse effect on the soluble oil. The saponification number of the product should be above 60 in order to insure the quality of the ultimate soluble oil product; since the entire liquid oxidation product becomes an ingredient of the soluble oil, a low saponification number product must be used in large amounts to provide a given proportion in the soluble oil of carboxyl content derived from oxidation, and the use of too large an amount of oxidation product in the soluble oil is disadvantageous because it provides too great a proportion in the soluble oil of the unoxidized low melting wax constituents of the foots oil.

The duration of the oxidation depends on the oxidation conditions and on the saponification number desired in the oxidized product. Ordinarily, with good contacting conditions, 30–60 hours will be sufficient to obtain a saponification number of 60–100.

According to the present invention, the entire liquid oxidation product is admixed with mineral lubricating oil and petroleum sulfonates to obtain a soluble oil containing the oxidation product in saponified form; the saponification of the oxidation product may be performed either before or after mixing with some or all of the other components of the soluble oil. Use of the "entire" oxidation product as the term is used here, does not mean that all of the product obtained in any one oxidation must necessarily be incorporated in a single batch of soluble oil, but rather that there is no separation of the liquid oxidation product into different types of constituents before incorporation of the liquid product in saponified form in the soluble oil.

The soluble oil composition according to the present invention should contain a "coupling agent" or "mutual solvent" in order to improve compatibility of lubricating oil and soap in the soluble oil. The coupling agent may also act as stabilizer for the oil-in-water emulsion formed upon emulsification of the soluble oil. Any suitable coupling agent for soluble oils may be employed, e. g. butyl monoether of ethylene glycol, hexylene glycol, etc. The amount of coupling agent should be sufficient to stabilize the soluble oil; the amount required to obtain satisfactory results varies with different coupling agents and with different relative proportions and properties of the other components of the soluble oil. Generally, the amount of coupling agent will be within the range from 1.0 to 3.0 volume percent. Mixed coupling agents may be used.

The soluble oil composition should contain a small amount of water. The amount of water required to obtain satisfactory stability varies with different relative proportions and properties of the other components of the soluble oil. Preferably, the water content of the soluble oil is within the range from 2.5 to 5.0 volume percent.

The following examples illustrate the invention:

Example I

A soluble oil composition was prepared by admixing the following materials in the stated proportions:

| | |
|---|---|
| Mineral oil (S. U. V. 100 at 100° F.)_____barrels__ | 802 |
| Petroleum mahogany sodium sulfonates (11 percent solution in mineral oil)_____barrels__ | 439 |
| Oxidized petroleum foots oil (sap. No. 75)___do____ | 199 |
| Petroleum sodium naphthenates (sap. No. 60) barrels__ | 244 |
| Caustic soda, 50° Bé_____do____ | 27 |
| Coupling agent, 2-methyl-2,4-pentanediol__gallons__ | 924 |

The water content of the soluble oil was adjusted to 2.7 volume percent. The compounded soluble oil had sulfonate saponification number equivalent of 3.3 indicating an organic SO₃ content of about 0.45 weight percent; the carboxylate saponification number equivalent was 16.8 mg. of KOH per gram; of which the oxidized foots oil and the naphthenic acids each contributed 8.4.

The oxidized foots oil had been prepared by oxidizing in liquid phase a petroleum foots oil obtained in the solvent deoiling of a distillate slack wax from furfural-refined lubricating oil, the foots oil having viscosity at 100° F. of about 28.9 centistokes, or about 136 S. U. S., and viscosity at 210° F. of about 5.2 centistokes, or about 43.2 S. U. S. The oxidation was performed by blowing air through the heated foots oil in the presence of a manganese-naphthenate containing catalyst. The oxidation temperature and pressure were about 250° F. and atmospheric pressure respectively. The oxidation was continued until the saponification number of the liquid oxidation product was 75, and 199 barrels of the product were incorporated, without any previous separation into different types of constituents, in the soluble oil.

The following is a typical manner of preparation of a foots oil suitable for use as charge stock for oxidation. Mixed base crude petroleum having A. P. I. gravity of about 40 is distilled to obtain a distillate having viscosity at 210° F. of about 43 S. U. S. and a residue having viscosity at 210° F. of about 120 S. U. S. The distillate is furfural refined, and the raffinate dewaxed using a solvent comprising 50% methyl ethyl ketone, 35% benzene, and 15% toluene. The dewaxing conditions are: solution temperature, 165° F.; dilution ratio (solvent to oil) 1 to 1, filtration temperature, −10° F. The residue is refined with propane and cresylic acid according to the "Duosol" technique, and the deasphalted residue is then dewaxed using the same solvent as in the distillate dewaxing. The dewaxing conditions are: solution temperature, 200° F., dilution ratio, 3.5 to 1; filtration temperature −10° F. The slack waxes obtained in dewaxing of distillate and residue, which slack waxes contain about 20 percent oil and 80 percent wax, are vacuum distilled together to obtain a light distillate boiling in the approximate range 300–500° F. at 2 mm. Hg and a heavy distillate boiling in the approximate range 400–600° F. at 2 mm. Hg. Both distillates are deoiled using a solvent comprising 60% methyl ethyl ketone and 40% benzene. The light distillate is deoiled in one stage: solution temperature, 165° F.; dilution ratio, 6 to 1; filtration temperature, 25° F. The heavy distillate is deoiled in two stages, the filtrate from the first stage (solution temperature, 165° F.; dilution ratio 2 to 1; filtration temperature 78° F.) being charged to the second stage (solution temperature, 165° F.; dilution ratio, 4.5 to 1, filtration temperature, 27° F.). The 25° F. filtrate from the light distillate and the 27° F. from the heavy distillate are each distilled to strip out solvent and recover foots oil as residue. The foots oils obtained from the two distillates are similar in properties and can be employed separately as oxidation charges, or blended together in any proportions, for example equal proportions. The recovered foots oil typically contains about 60 percent oil and 40 percent low melting wax, has pour point of about 70° F., viscosity at 210° F. of about 6 centistokes, average molecular weight of about 440, and refractive index $n_D^{20°}$ of 1.4726, and contains about 10 volume percent aromatic constituents, about 5 percent paraffinic constituents, and about 85 percent naphthenic constituents.

The soluble oil prepared as described above was found to have highly satisfactory oil stability and emulsion stability properties and was found in standard tests and in actual commercial use to be substantially superior, for use in aqueous emulsion as a cutting oil in metal working operations, to prior art soluble oils wherein the entire carboxyl content of the soluble oil was provided by petroleum naphthenic acids, rather than by a mixture of petroleum naphthenic acids and oxidized foots oil.

Aqueous emulsions of the soluble oil were found in standard corrosion tests to be substantially less corrosive to cast iron plate than aqueous emulsions of prior art soluble oils which were prepared according to the same formula except that petroleum naphthenic acids contributed all the equivalent carboxylate saponification value in the prior art formula, instead of contributing only about half of the equivalent carboxylate saponification value, as in the soluble oil according to the invention, wherein oxidized foots oil provided the other half.

Aqueous emulsions of the soluble oil were found, in the standard "cotton duck sinking test" to have better detergency properties than emulsions of the above-described prior art soluble oils. In 10 percent emulsion, the soluble oil gave a sinking time of 15.5 seconds as compared with a sinking time of 25.8 seconds for the prior art soluble oil. In 5 percent emulsion, the soluble oil gave a sinking time of 50 seconds as compared with 163 seconds for the prior art soluble oil.

Aqueous emulsions of the soluble oil were found, in actual lathe tests, to provide improved action enabling the use of higher operating speeds. In the making of studs with a Warner-Swasey No. 3 lathe by cutting six-inch lengths from a ¾-inch diameter SAE 4140 steel rod, then threading the ends of the six-inch sections, it was possible without tearing the threads to operate at a surface speed which was at least 13 feet per minute higher when using a soluble oil according to the invention than when using the above-described prior art soluble oil.

Aqueous emulsions of the soluble oil were found in actual commercial use to have better metal-wetting properties than emulsions of prior art soluble oils of the type described above. These properties enable the soluble oils according to the invention to maintain the surface of the metal being cut in a cleaner condition and more free from fouling by metal cuttings and dust; these properties make it possible to dispense with the use of an added liquid soap which has frequently had to be used with prior art soluble oils.

*Example II*

A soluble oil was prepared by admixing the following materials in the stated proportions:

| | |
|---|---|
| Mineral oil (S. U. V. 100 at 100° F.) ____grams__ | 405 |
| Petroleum mahogany sodium sulfonates (10.9 percent solution in mineral oil)_____grams__ | 375 |
| Oxidized petroleum foots oil (sap. No. 76)__do____ | 203 |
| Caustic soda, 50° Bé_____milliliters__ | 15.0 |
| Coupling agent_____vol. percent__ | 1.0 |

The water content of the soluble oil was adjusted to 4.5 volume percent. The compounded soluble oil had sulfonate saponification number equivalent of 4.9 indicating an organic $SO_3$ content in the soluble oil of about 0.67 weight percent; the carboxylate saponification number equivalent was 15.4. The compounded soluble oil had free alkalinity of 0.07% as NaOH.

The oxidized foots oil had been prepared in a manner generally similar to that employed in Example I, the oxidation being conducted at a temperature of 240–260° F. to a saponification number of 76.

The coupling agent used was a blend of 60% butyl monoether of ethylene glycol, and 40% of octylphenyl monoether of polyethylene glycol having an average of 10 ethylene glycol units per molecule; the latter compound may be represented by the following average formula: $C_8H_{17}C_6H_4O(CH_2OCH_2)_{10}OH$.

The soluble oil was tested for stability by allowing it to stand for 48–72 hours at 10° F., and then observing it at room temperature to determine whether there were any signs of separation of an upper oil layer from the mixture of oil and soap, or any signs of haziness or gelation in the soluble oil. Since there were no signs of such oil separation, haziness, or gelation, the oil was rated stable.

The soluble oil was also tested for emulsion stability by emulsifying 10 parts by volume of the soluble oil in 90 parts by volume of tap water at 45° F., allowing the emulsion to come to room temperature while standing for 24 hours, and observing the emulsion at the end of that period to determine whether any substantial amount of oil or "cream" had separated from the emulsion and formed an upper layer thereon. Since no substantial amount of oil or cream had separated, the soluble oil was rated as satisfactory in emulsion stability.

The soluble oil was found in actual tests to have highly satisfactory detergency and anti-corrosive properties, and to provide excellent results in lathe tests.

This example shows that a soluble oil composition comprising mineral oil, alkali metal sulfonate, water, and the saponified, unseparated liquid product of oxidation of mineral oil, the composition containing 0.67 weight percent organic $SO_3$ and having carboxylate saponification number of 15.4, all of which is provided by the oxidation product, is highly satisfactory from the standpoint of oil stability, emulsion stability, and other important properties.

The soluble oils according to the present invention contain a major proportion of lubricating oil and a minor proportion of a saponified product obtained by catalytic oxidation in liquid phase of foots oil by means of a free-oxygen-containing gas until the oxidized product has a saponification number within the approximate range 60 to 100. Since the oxidation product is employed as an ingredient in the soluble oil without any previous separation of unsaponifiable material or other constituents from the non-gaseous oxidation products, it is seen that substantially all constituents of the liquid oxidation products including unsaponifiable material and saponifiable material and catalyst, become constituents of the soluble oil product. When the oxidation is effected to a saponification number of about 60–100, the proportion of unoxidized foots oil in the oxidation product will generally be such that the proportion of unoxidized foots oil in the soluble oil product is less than about 25 percent, more preferably less than about 10 percent.

The equipment in which the oxidation according to the invention is effected is relatively simple. A suitable tank for example is one having means for introducing oxygen-containing gas, preferably to a lower portion of the tank, and preferably with means for obtaining good dispersion of such gas throughout the cross section of the body of foots oil in the tank, and having means for venting gases, preferably from an upper portion of the tank. The tank can suitably be provided with heat transfer coils, through which steam can be passed to heat the contents of the tank to the desired oxidation temperature, and through which if necessary water can be circulated after the oxidation has been initiated, to prevent the exothermic heat of reaction from developing too high a temperature. Advantageously, the tank can be constructed of material resistant to corrosion by the acidic oxidation products.

In operation of the equipment, gases are preferably vented rapidly enough to maintain approximately atmospheric pressure in the tank. Low boiling oxidation products can be recovered from the vent gases if desired, or they can be discarded as a waste product of the oxidation.

Where low melting wax is referred to in the present specification, a material crystallizable from a dewaxing solvent such as methyl ethyl ketone at 0° F., but having a melting point less than about 100° F. is to be understood. Lubricating oil, on the other hand, is to be understood as distinguished from low melting wax in that lubricating oil is not crystallizable from a dewaxing solvent at 0° F. Foots oil is a mixture of lubricating oil and low melting wax and therefore includes some constituents crystallizable from a dewaxing solvent at 0° F., and some not crystallizable from a dewaxing solvent at 0° F., foots oil is substantially free, however, from wax melting above about 100° F.

Carboxylate saponification number equivalents as disclosed in the preceding specification are obtained, for a material containing neutralized carboxylic acids, by multiplying the weight fraction of that material in the soluble oil by the saponification number of the material prior to neutralization of the carboxylic acids.

Foots oil for use as oxidation charge according to the invention preferably contains about 10 to 60 weight percent of wax, more preferably 20 to 50 weight percent, as determined by crystallization from methyl ethyl ketone at 0° F., through other wax contents are within the scope of the invention.

This application is a continuation-in-part of our copending application Serial No. 327,898 filed December 24, 1952, now abandoned, which was a continuation-in-part of our application Serial No. 271,416, filed February 13, 1952, now abandoned, disclosing and claiming soluble oil compositions containing petroleum naphthenates and oxidized foots oil.

The invention claimed is:

1. A soluble oil composition capable of forming stable oil-in-water emulsions which comprises: mineral lubricating oil; alkali metal petroleum mahogany sulfonates; material selected from the group consisting of the saponified, normally liquid product obtained by partial oxidation of petroleum foots oil and having saponification number in the approximate range from 60 to 100 mg. of KOH per gram and a mixture of said product in saponified form and alkali metal petroleum naphthenates; a coupling agent in minor proportion to stabilize said soluble oil; and a minor proportion of water to stabilize said soluble oil; said composition containing from 0.3 to 1.0 weight percent of organic $SO_3$ and having total carboxylate saponification number equivalent within the approximate range from 10 to 20 mg. of KOH per gram, at least 2 mg. of KOH per gram of which are provided by said product.

2. Composition according to claim 1 wherein said composition contains from 0.5 to 1.0 weight percent organic $SO_3$ and wherein substantially all of said total carboxylate saponification number is provided by carboxylic acid constituents of said product obtained by partial oxidation.

3. Composition according to claim 1 wherein said composition comprises alkali metal petroleum naphthenates and wherein said carboxylate saponification number equivalent is provided partly by petroleum naphthenic acids and partly by carboxylic acid constituents of said product of partial oxidation at least 20% of said carboxylate saponification number equivalent being provided by said carboxylic acid constituents.

4. A soluble oil composition capable of forming stable oil-in-water emulsions which comprises: lubricating oil having S. U. viscosity at 100° F. within the range from 40 to 120; sodium mahogany sulfonates; the saponified, normally liquid product obtained by partial oxidation at approximately atmospheric pressure, of a petroleum foots oil having S. U. viscosity at 100° F. within the range from 125 to 200, said product having saponification number in the approximate range from 60 to 100, said composition containing from 0.65 to 1.0 weight percent of organic $SO_3$ and having carboxylate saponification number equivalent of at least 10 and less than 17, substantially all of which is provided by carboxylic acid constituents of said product obtained by partial oxidation; said composition containing a minor proportion of a coupling agent to stabilize said soluble oil and from 2.5 to 5.0 volume percent of water.

5. A soluble oil composition capable of forming stable oil-in-water emulsions which comprises: lubricating oil; alkali metal petroleum sulfonates; alkali metal petroleum naphthenates; saponified oxidized foots oil obtained by catalytic oxidation in liquid phase and at about atmospheric pressure of foots oil containing insufficient aromatic constituents to substantially inhibit the oxidation, by means of a free-oxygen-containing gas until the oxidized product has a saponification number within the approximate range 60–100, 25–80% of the total carboxylate saponification number equivalent of said soluble oil being provided by petroleum naphthenic acids, the saponified oxidized foots oil containing substantially all constituents of the non-gaseous product of said oxidation and providing about 20–75 percent of the total carboxylate saponification number equivalent of said soluble oil; said composition having carboxylate saponification number equivalent from 10 to 20, said composition containing a minor proportion of a coupling agent to stabilize said soluble oil and from 2.5 to 5.0 volume percent of water, said composition containing from 0.3 to 1.0 weight percent of organic $SO_3$.

References Cited in the file of this patent

UNITED STATES PATENTS

| | | |
|---|---|---|
| 2,653,909 | Frazier | Sept. 29, 1953 |
| 2,671,759 | Eckert | Mar. 9, 1954 |